Oct. 27, 1964  J. C. MARINACE ET AL  3,154,502
LUMINESCENT GERMANIUM DIOXIDE COMPOSITIONS
Filed July 12, 1961

INVENTORS
JOHN C. MARINACE
NICHOLAS N. WINOGRADOFF

BY Alvin J. Riddles
ATTORNEY

United States Patent Office 3,154,502
Patented Oct. 27, 1964

3,154,502
LUMINESCENT GERMANIUM DIOXIDE
COMPOSITIONS
John C. Marinace and Nicholas N. Winogradoff, both of Yorktown Heights, N.Y., assignors to International Business Machines Corporation, New York, N.Y., a corporation of New York
Filed July 12, 1961, Ser. No. 123,498
5 Claims. (Cl. 252—301.6)

This invention relates to luminescent materials; and, in particular, to germanium dioxide as a luminescent material.

Luminescent materials have been found useful in the art in the conversion of one form of energy to another; and, in particular, in the conversion of light and/or electrical energy to a different frequency of light energy.

Devices employing these luminescent materials may be fabricated for use as light frequency converters, display panels and for most applications in which devices employing phosphorescent materials have been used in the art to date. Many of the luminescent materials available in the art are sulfide compounds, such as zinc, aluminum, or cadmium sulfide containing activating elements in very small, critical quantities, on the order of parts per million. These materials require close control in the process of formation.

What has been discovered is that an improved useful luminescent material can be provided by introducing various luminescence producing activating elements and compounds into the material germanium dioxide. The germanium dioxide based luminescent material of the invention exhibits luminescence over a wider range of "luminescence producing activator" concentration than has been seen heretofore in the art. A luminescence producing activator for purposes of the invention may be defined as a material incorporated into the host luminescent material which results in a radiative energy transition taking place when energy is applied to the combination of the activator and the host material.

It is an object of this invention to provide improved luminescent material.

It is another object of this invention to provide improved methods of making luminescent materials.

It is another object of this invention to provide an improved photoluminescent material.

It is another object of this invention to provide an electroluminescent material.

It is another object of this invention to provide a luminescent material wherein the weight ratio requirement of the host material to the activating material is relaxed.

It is another object of this inventon to provide luminescent material that has controllable luminescent properties.

The foregoing and other objects, features and advantages of the invention will be apparent from the following more particular description of a preferred embodiment of the invention, as illustrated in the accompanying drawings.

A luminescent material, as the term has developed in the art, comprises a host material having a substantial energy gap separation between the valence and conduction bands, and containing various elements serving as activators. The activator serves to provide a site in the material at an energy state that is between the valence and conduction band energy states of the host material. The energy separation between the energy state of the sites provided by the activator and the conduction band of the host material is one of the controlling criteria for the performance properties of the particular luminescent material.

In accordance with the invention, the material germanium dioxide ($GeO_2$) has been found to be an improved "host" material with luminescent properties by introducing various elements or combinations of elements into the germanium dioxide to serve as luminescence producing activators, in weight ratios as great as 50% of the host material. The germanium dioxide luminescent material so produced has its luminescent properties controllable by the nature of the exciting energy, the luminescence producing activators, and the firing temperature in the manufacturing process. The luminescent material of the invention may be manufactured with substantially relaxed requirements on concentration of luminescence producing activators. For example, where the conventional luminescent materials, such as phosphors, currently employed in the art, require parts per million of an activator, it has been found that germanium dioxide luminescent performance is observable up to 50% by weight of host and the luminescence producing activator material. In view of the large tolerance on concentration, it will be apparent that the "luminescence producing activator" in the invention is, of course, of a different nature to that normally introduced in the form of impurities in parts per million.

The germanium dioxide luminescent material of the invention is in tetragonal crystal form having a band energy gap width of 5.5 electron volts and, in accordance with the invention, may be provided with luminescence producing activators in a concentration up to 50% by weight of the host material. A material will serve as a luminescence producing activator that will provide a site within the material at an energy level within the 5.5 electron volt band gap separation and which provides a radiative energy transition when the combination of the host and the luminescence producing activator are subjected to a source of applied energy. The luminescent producing activators may be combined with the $GeO_2$ either individually or from compound type sources. For example, typical suitable sources of luminescence producing activators are manganese (Mn), zinc (Zn), zinc chloride ($ZnCl_2$), manganese chloride ($MnCl_2$), cadmium chloride ($CdCl_2$), antimony chloride ($SbCl_3$), phosphorus pentoxide ($P_2O_5$) and the combination of $MnCl_2+P_2O_5$.

Figure 1:
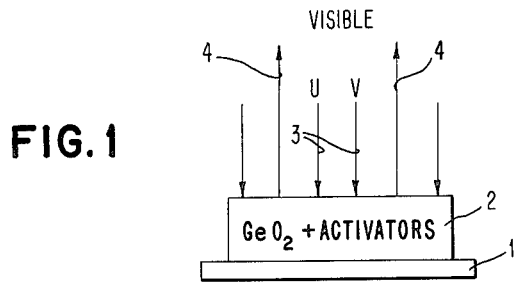
FIG. 1 is a schematic view of the luminescent material of the invention showing response to light.

Referring now to FIG. 1, a schematic view is provided illustrating the photoluminescent properties of the material invention. In FIG. 1 a substrate 1 supporting the germanium dioxide luminescent material 2 is provided. The substrate is generally of a relatively inert material, for example glass or metal. The luminescent material 2, as described, is comprised of germanium dioxide ($GeO_2$) as a host material activated by luminescence producing elements or compounds in concentration up to 50% by weight of the $GeO_2$. It is believed that some of the luminescence producing activators combine with or form an intimate heterojunction between themselves and the $GeO_2$ crystallites, and that it is this heterojunction which is responsible for the emission of light. The actual color of the light emitted, that is, its spectral distribution, is believed to depend on small electrical disturbances which may influence the energy levels in the vicinity of the heterojunction.

In FIG. 1, the $GeO_2$ luminescent material 2 is irradiated with ultraviolet light 3 and in turn the $GeO_2$ luminescent material radiates visible light 4. In addition to visible luminescent radiation 4 in response to the ultraviolet light 3, the luminescent material 2 also responds to electrical or optical stimulation from such devices as a Tesla coil giving off visible light 4. Further, the visible light 4 is emitted when the material 2 is bombarded by beta particles and with X-rays.

The material of the invention may be prepared by reacting the luminescence producing activator material into or onto the $GeO_2$ host material to provide the necessary luminescence producing activator sites. Two preferred methods are set forth in connection with FIGS. 2 and 3 for the combining of the luminescence producing activator and the host material. The two methods set forth in the following description are the mechanical mixing of the host and the luminescence producing activator followed by a firing operation for the intimate combination of the luminescence producing activator into the $GeO_2$ and the maintaining of the $GeO_2$ in a vapor of the source of a luminescence producing activator for intimate combination by diffusion of the activator into the $GeO_2$.

Figure 2:
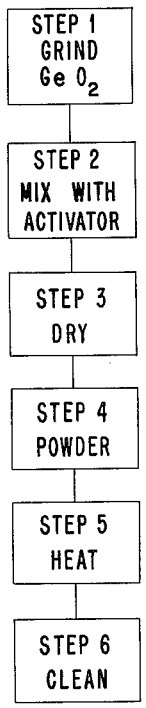
FIG. 2 is a flow chart showing the steps in one method of preparation of the material of the invention.

Referring next to FIG. 2, a quantity of $GeO_2$ of high purity, reagent grade, or better, is ground into a fine powder in Step 1. In Step 2, the $GeO_2$ is mixed with a quantity which may be up to 50% by weight of a powdered source of luminescence producing activator material and a small quantity of distilled water to form a slurry. In Step 3, the slurry is dried in an oven at about 85° C. until the distilled water is driven off. In Step 4, the dried mixture of $GeO_2$ host material and source of luminescence producing activator is then placed in a quartz boat and heated, in Step 5, in a stream of argon gas at a temperature sufficient to combine the luminescence producing activator and the $GeO_2$ to form luminescence producing activator sites. A temperatures between 600–700° C. is adequate for this operation. The time required for the luminescence producing activation may range from 5 minutes to several hours, depending on the depth of activation and grain size of the host material.

The procedure set forth in FIG. 2 in Steps 1–5 provides an excess of the source of the luminescence producing activator along with the activated $GeO_2$. This is cleaned in Step 6, generally by washing with water and alcohol. In connection with Step 6, the cleaning process is much easier when the temperatures employed for the heating are low enough to prevent fusing of the $GeO_2$ and the source of the luminescence producing activator material. In other words, it is better to combine the luminescence producing activator more slowly so that the activated $GeO_2$ can be cleaned more readily in a later step. It should be noted that the luminescence producing activator to hose $GeO_2$ ratio used in preparing the mixture prior to heating is not critical.

Since the excess luminescence producing activator can be easily removed by continued heating, if volatile, or by cleaning the product as described above in Step 6, the $GeO_2$ luminescent material of the invention may be economically fabricated under more relaxed composition requirements than has been seen heretofore in the art.

A number of specific examples are provided in Table I for the process described in connection with FIG. 2, illustrating the weight ratio of luminescence producing activator material to $GeO_2$; the firing specifications and the luminescent properties under ultraviolet radiation for various luminescence producing activator materials.

*Table I*

| Luminescence Producing Activator Material Source | Weight Ratio Luminescence Producing Activator/$GeO_2$ Source | Heating Temp., °C. | Heating Time | Luminescent Properties Under Short-wave U. V. Radiation |
| --- | --- | --- | --- | --- |
| $ZnCl_2$ | 1:10 | 750 | 7 mins | Strong yellow green → green, long blue-green afterglow. |
| $MnCl_2$ | 1:10 | 1,050 | 15 mins | Mauve pink. |
| $MnCl_2+P_2O_5$ | 0.5:1:10 | 800 | 15 mins | Intense orange red, red afterglow. |
| $CdCl_2$ | 1:10 | 850 | 10 mins | Blue-violet. |
| Mn | 001:100 | 1,000 | 3 hrs | Pink. |
| $P_2O_5$ | 1:1 | 800 | 20 mins | Bluish white with yellowish green regions. |

Figure 3:
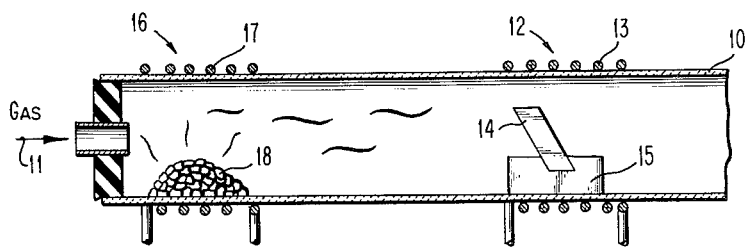
FIG. 3 is a schematic view of an apparatus employed in another method of preparation of the material of the invention.

Referring next to FIG. 3, there is described an apparatus for a method of preparation of the $GeO_2$ luminescent material of the invention, particularly adapted for sources of lower vapor pressure volatile luminescence producing activator material. In FIG. 3, a tube 10, for example, of an inert refractory material such as quartz, is provided with a flow of inert gas 11. The inert gas may, for example, be argon and serves the purpose of a vehicle to transport a vapor of a source of a luminescence producing activator material to be later described. The flow of the gas 11 is shown as an arrow. The tube 10 has a first independently controlled heating zone 12. The zone 12 is shown provided with a resistance heating coil 13 which may be connected to a variable source of power, not shown. In the zone 12, a substrate of $GeO_2$, 14, is positioned in a holder 15. Upstream in the flow of the gas 11, in a separate heat controlled region 16, controlled by a coil 17, connected to a source of variable power, not shown, a source of luminescence producing activator material 18 is positioned. The temperature of the zone 16 is so regulated that the luminescence producing activator material 18 is vaporized and carried downstream by the gas 11 over the substrate 14. The temperature of the zone containing the substrate is maintained at a temperature optimum for diffusion of the luminescence producing activator 18 into the $GeO_2$, 14. Wherever possible a luminescence producing activator material vapor pressure of approximately 10 mm. of mercury is maintained.

In Table II, there is provided a listing of temperature, heating time and luminescent properties for various diffused luminescence producing activator materials into $GeO_2$ using the apparatus illustrated in FIG. 3.

*Table II*

| Luminescence Producing Activator Material Source | Luminescence Producing Activator Material Source Temp. (Zone 13), °C. | $GeO_2$ Temp. (Zone 12), °C. | Heating Time | Luminescent Properties Under Short-wave U.V. Radiation |
| --- | --- | --- | --- | --- |
| $ZnCl_2$ | 500 | 1,000 | 1 hr | Strong bright green with long afterglow. |
| $ZnCl_2$ | 500 | 700 | 20 mins | Strong white with long afterglow. |
| $SbCl_3$ | 200 | 1,000 | 20 mins | Strong pink-red. |

As a specific example of the performance of the germanium dioxide luminescent material of the invention the $GeO_2$ activated with zinc chloride described in Table I exhibited a photoluminescence under a shortwave ultraviolet radiation of 2537 Angstrom units wavelength. The photoluminescence changes from a bright yellow green to a bright blue green within a few seconds of exposure to the ultraviolet radiation. This material exhibits a blue green luminescence when bombarded with beta particles of 0.54 mev. ejected from a 40 mc. strontium source and the material exhibits luminescence in the blue green portion of the spectrum when irradiated with X-rays.

As a second specific example, the germanium dioxide luminescent material of the invention when activated with phosphorus from a source of $P_2O_5$ exhibits a luminescence in a bluish white color when placed in an evacuated quartz tube and excited with a Tesla coil. This same material also exhibits a luminescence in a bluish white color when subjected to ultraviolet radiation with a wavelength of 2537 Angstrom units.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. A crystalline metallic oxygen compound for use as a luminescent material consisting of germanium dioxide and a fluorescence inducing activator selected from the group consisting of manganese chloride, zinc chloride, cadmium chloride, antimony chloride, phosphorus pentoxide and the combination of phosphorus pentoxide and manganese chloride and having respectively weight ratios to germanium dioxide of 1:10, 1:10, 1:10, 1:1, and 0.5:1:10.

2. A method of forming a composition for use as a luminescent material comprising, in combination, the steps of: grinding a host material consisting essentially of germanium dioxide to produce a fine powder, introducing a luminescent producing activator selected from the group consisting of manganese chloride, zinc chloride, cadmium chloride, antimony chloride, phosphorus pentoxide, and the combination of phosphorus pentoxide and manganese chloride into said host material, said activators having respectively weight ratios to germanium dioxide of 1:10, 1:10, 1:10, 1:1, and 0.5:1:10, and activating said host material by heating said host and activator at a temperature between 600° and 1060° C. in a noble gas.

3. A method according to claim 2 wherein the step of introducing a luminescent producing activator includes the steps of vaporizing said activator material and convectively transporting said vaporized activator to said host material.

4. A method according to claim 2 wherein the step of introducing a luminescent producing activator includes the steps of mixing said activator mechanically with said host material in distilled water to form a slurry and heating said slurry at a temperature sufficient to dry the host activator combination.

5. A method according to claim 2 further including the steps of cleaning the surface of said luminescent material by washing with water and alcohol to remove excess activator.

References Cited in the file of this patent

UNITED STATES PATENTS

| | | |
|---|---|---|
| 2,447,448 | Williams | Aug. 17, 1948 |
| 2,457,054 | Leverenz | Dec. 21, 1948 |
| 2,470,173 | Leverenz | May 17, 1949 |
| 2,851,425 | Thorington | Sept. 9, 1958 |

FOREIGN PATENTS

| | | |
|---|---|---|
| 782,095 | Great Britain | Sept. 4, 1957 |

OTHER REFERENCES

Kroger: "Some Aspects of the Luminescence of Solids," Elsevier Publ. Co., New York, 1948, p. 295.

Koelmans et al.: "The Fluorescence of Binary and Ternary Germanates of Group II Elements," Journal of the Electrochemical Society, August 1959, pages 677–681.